US006550500B2

(12) United States Patent
Järvenkyläet al.

(10) Patent No.: US 6,550,500 B2
(45) Date of Patent: Apr. 22, 2003

(54) PLASTIC PIPE HAVING A SOCKET, AND A METHOD OF PROVIDING A PLASTIC PIPE WITH A SOCKET

(75) Inventors: Jyri Järvenkylä, Hollola (FI); Esko Hippeläinen, Lahti (FI)

(73) Assignee: Uponor Innovation Ab, Fristad (SE)

( * ) Notice: Subject to any disclaimer, the term of this patent is extended or adjusted under 35 U.S.C. 154(b) by 0 days.

(21) Appl. No.: 09/968,675

(22) Filed: Oct. 1, 2001

(65) Prior Publication Data

US 2002/0070551 A1 Jun. 13, 2002

Related U.S. Application Data

(63) Continuation of application No. PCT/FI00/00282, filed on Mar. 31, 2000.

(30) Foreign Application Priority Data

Apr. 1, 1999 (FI) .................... 990740
Jan. 28, 2000 (FI) .................... 20000179

(51) Int. Cl.[7] .................... F16L 21/00

(52) U.S. Cl. .................... 138/109; 138/137; 138/140; 285/374; 285/399

(58) Field of Search .................... 138/137, 109, 138/140, 141; 285/374, 399

(56) References Cited

U.S. PATENT DOCUMENTS

| | | | | |
|---|---|---|---|---|
| 3,838,713 A | * | 10/1974 | Tubbs | 138/109 |
| 3,884,269 A | | 5/1975 | Schetty et al. | 138/137 |
| 3,887,992 A | * | 6/1975 | Parmann | 264/249 |
| 3,943,273 A | | 3/1976 | De Putter | 174/84 S |
| 4,047,739 A | * | 9/1977 | Aitken | 285/111 |
| 4,258,935 A | | 3/1981 | Rodrigo et al. | 285/21 |
| 4,457,542 A | * | 7/1984 | Shaefer et al. | 285/55 |
| 4,622,086 A | | 11/1986 | Piick et al. | 156/166 |
| 5,305,799 A | * | 4/1994 | Dal Palu | 138/109 |
| 5,526,847 A | | 6/1996 | Macovaz et al. | 138/109 |
| 5,653,935 A | * | 8/1997 | Hallstedt | 264/516 |
| 5,829,483 A | * | 11/1998 | Tukahara et al. | 138/109 |
| 5,884,669 A | * | 3/1999 | Braun | 138/109 |
| 6,053,214 A | * | 4/2000 | Sjoberg et al. | 138/134 |

FOREIGN PATENT DOCUMENTS

| | | | |
|---|---|---|---|
| CH | 595 965 | 2/1978 | B29C/17/02 |
| DE | 28 35 968 | 3/1979 | F16L/21/02 |
| EP | 0 032 824 | 7/1981 | F16L/47/06 |
| FI | 782490 | 11/1979 | F16L/47/06 |
| FI | 94902 | 7/1995 | F16L/47/06 |

* cited by examiner

*Primary Examiner*—Patrick Brinson
(74) *Attorney, Agent, or Firm*—Fish & Richardson P.C.

(57) ABSTRACT

A plastic pipe provided with a socket and a method of providing a plastic pipe with a socket, whereby the socket comprises at least two layers. The orientation of at least one socket layer is different from the orientation of another layer and the orientation of at least one layer is different from the orientation of a body portion of the plastic pipe. The socket is made for instance from a plastic pipe comprising at least two layers. The orientation temperatures of at least two different layers are different. The plastic pipe is heated to a temperature at which the material of at least one layer is oriented during expansion and the material of at least one layer is substantially not oriented during expansion. The end of the plastic pipe is expanded at said temperature so as to provide it with a socket.

7 Claims, 2 Drawing Sheets

Figure 1A:
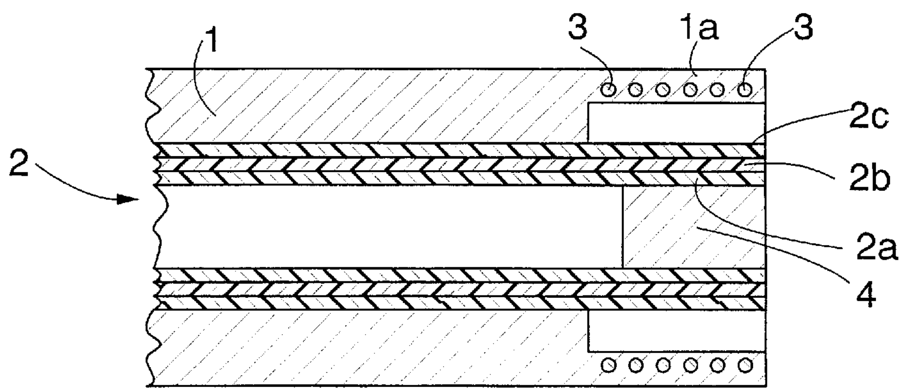

10
8
5b
7a
7
5
5a
9
6
2

PLASTIC PIPE HAVING A SOCKET, AND A METHOD OF PROVIDING A PLASTIC PIPE WITH A SOCKET

This application is a Continuation of International Application PCT/FI00/00282 filed Mar. 31, 2000 which designated the U.S. and was published under PCT Article 21(2) in English.

The invention relates to a plastic pipe having a socket, the pipe comprising a body portion and at least at one of its ends the socket which has at least two layers.

The invention further relates to a method of providing a plastic pipe with a socket, in which method at least one end of a body portion of the plastic pipe is heated and expanded so as to form the socket.

The socket portion is typically the weakest portion of a pipe. To reinforce the socket, Finnish Patent 94902 teaches a solution for generating in the socket an orientation which differs from the orientation of the rest of the pipe. However, such a forcefully orientated material is not always suitable for the inner surface of a socket. In some plastics, for example, the solvent glue may trigger stress-cracking in the surface, thus making a glue joint impossible. Finnish Patent 945107, in turn, discloses a socket comprising an expanded pipe end and a sleeve adapted inside it. However, even such a solution does not often sufficiently improve the characteristics of the socket.

It is an object of the present invention to provide a plastic pipe and a method for avoiding at least some of the above drawbacks.

The plastic pipe of the invention is characterized in that the orientation of at least one layer of the socket differs from the orientation of another layer, and the orientation of at least one layer differs from the orientation of the body portion.

The method of the invention is characterized in that the plastic pipe comprises at least two layers and that the end of the plastic pipe is expanded so as to provide the plastic pipe with a socket, the orientation of at least one layer of which socket differs from the orientation of another layer and the orientation of at least one layer differs from the orientation of the body portion.

An essential idea of the invention is that the pipe comprises a socket having at least two layers and that the orientation of at least one layer differs from the orientation of the body portion of the pipe. A further essential idea is that the orientation of at least one layer of the socket differs from the orientation of another layer of the socket. The idea of a preferred embodiment is that the socket is composed of a portion of the pipe which is formed broader and of a sleeve disposed therein. The pipe is expanded for example at a temperature which does not substantially change its orientation, and the orientation of the socket differs from the orientation of the pipe, or the pipe is expanded at a temperature which changes its orientation, and the orientation of the socket differs from that of the expanded portion of the pipe. It is the idea of another preferred embodiment that the socket is composed of the end of a pipe having at least two layers, the end being expanded so that a socket forms therein. For example the layers of the pipe are of a different material so that their orientation temperatures are different. Before the end of the pipe is expanded, said end is heated to a temperature which causes orientation in the material of at least one layer during the expansion but which substantially causes no orientation in the material of at least one layer during expansion. Furthermore, a different orientation in different layers can be achieved for example by heating only one surface of the feedstock pipe. The surface being heated reaches such a high temperature that the tension brought about by the drawing relaxes immediately and the surface does not get oriented, but the inner, colder surface does get oriented.

A preferred construction is achieved when the material is oriented by drawing, but also contains staple fibres. Ideally, the socket comprises two layers which are reinforced by fibres and in which the opposite fibre directions are at an angle of about 50 degrees with respect to the axis and provide pressure resistance. The third layer is provided with an axial reinforcement which thus makes the orientation different as compared with the other layers. In a tension resistant pipe, said axial layer is needed only in the socket portion, not in the pipe. Finally, the entire construction is covered with a thermoplastic fibre-free inner and outer layer.

It is an advantage of the invention that the mechanical strength of the socket becomes as good as or even better than the rest of the pipe. By arranging different orientations to the socket layers, at least one layer, for example, is provided with an axial orientation which makes the socket extremely tension resistant, and at least one layer with a radial orientation which makes the socket pressure resistant. On the other hand, at least one layer may be oriented, whereby the mechanical and, possibly, also barrier characters, of the socket improve and at least one layer may be arranged substantially non-oriented, whereby its chemical characteristics are good.

The orientation of the pipe and/or socket can be achieved by different methods. Molecular orientation is concerned when it is achieved for example by drawing or shearing (for example a rotating mandrel in a tool). Different grades of orientation may also be achieved by making some layer of the pipe an/or the socket from a fibre-reinforced thermoplastic. The present invention only relates to self-reinforcing thermoplastic pipes and/or thermoplastic pipes reinforced with staple fibres. Plastic pipes reinforced with continuous fibres are not covered by the invention since the pipe cannot be provided with a socket by expansion. Instead, staple fibres glide in matrix plastic and present no problems for expanding the socket.

In the present description, the term 'socket' refers to that portion of the end of a pipe which is arranged broader than the rest of the pipe either by expanding the pipe or by arranging a sleeve on the outside of the pipe. Further, the term 'a socket having at least two layers' implies that at least one layer of the socket is an integral part of the wall of the rest of the pipe and the sleeve may constitute the second layer, or both the pipe and the socket may have at least two layers such that the socket layers are integral with the corresponding pipe layers. In the latter case thus refers to an integral pipe socket having at least two layers.

Figure 1B:
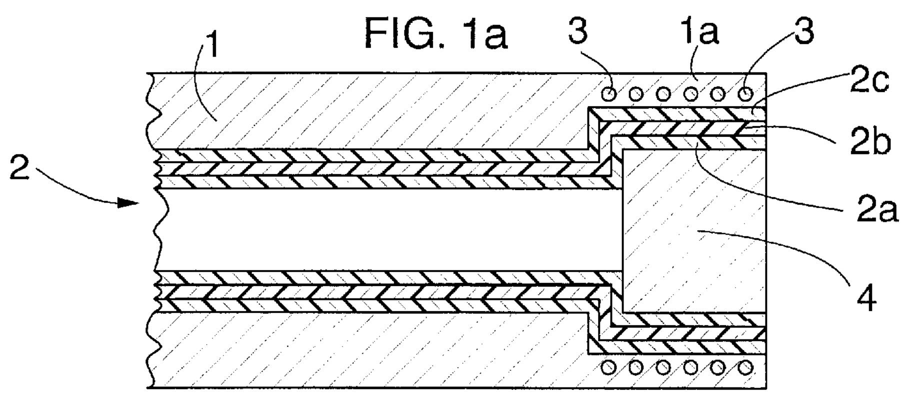
Figure 1C:
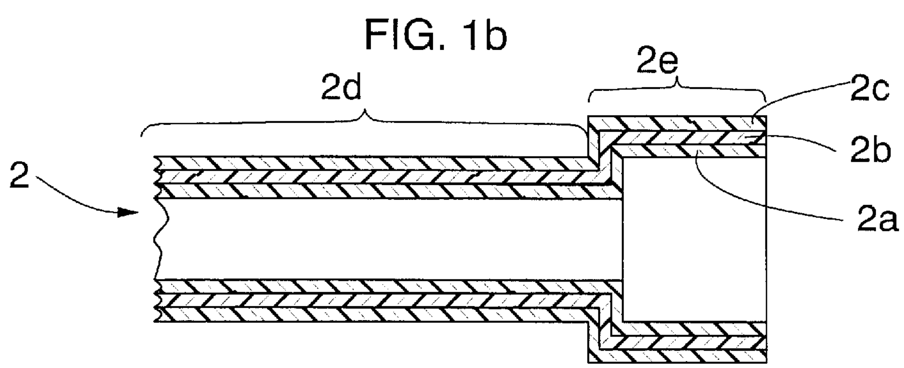
Figure 2:
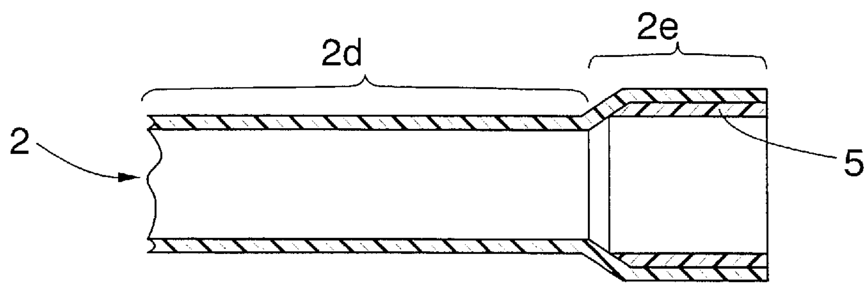
Figure 3:
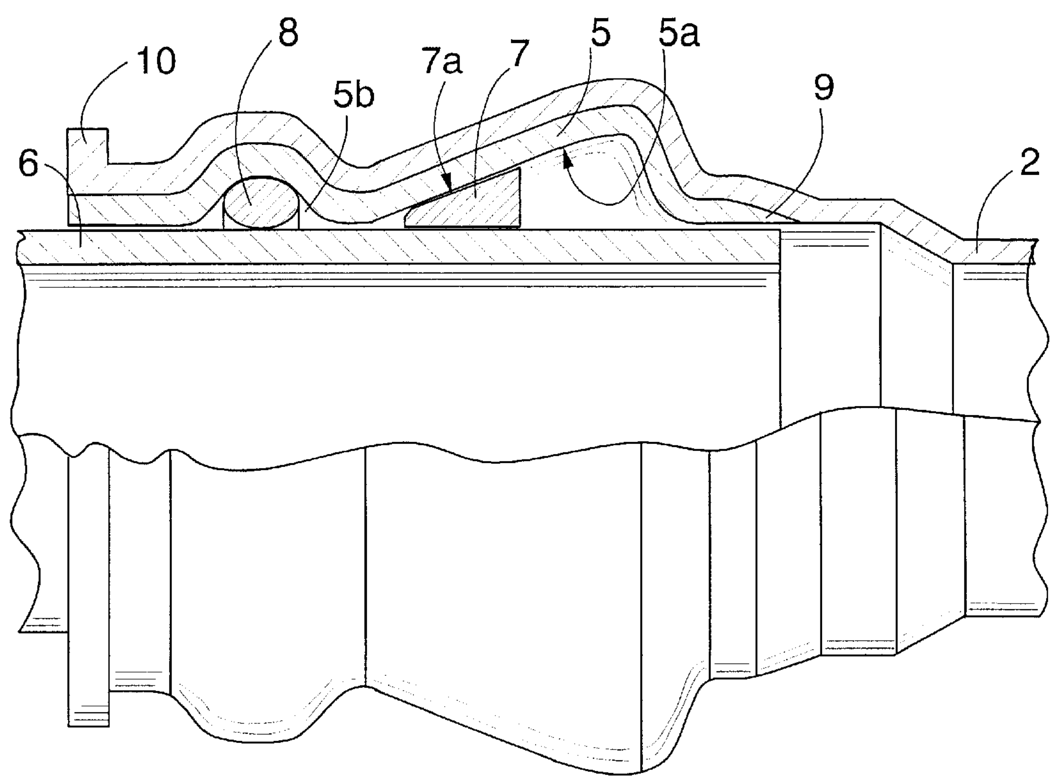

The invention will be described in greater detail in the attached drawings, in which FIGS. 1*a*, 1*b* , and 1*c* are schematic sectional side views of the process steps of a method of the invention, FIG. 2 is a schematic sectional side view of a second plastic pipe provided with a socket according to the invention, FIG. 3 is a schematic side view in partial section of a third plastic pipe provided with a socket according to the invention.

FIG. 1*a* shows a mould 1, inside which is arranged a three-layer plastic pipe 2. Heating means 3 for heating the end of the plastic pipe 2 are arranged in a socket support 1*a* in the mould 1. Inside the plastic pipe 2 is arranged an expansion mandrel 4. The expansion mandrel 4 is a device with which the plastic pipe 2 can be mechanically expanded.

The expansion mandrel 4 may be for example of rubber, whereby it expands when air is pumped inside thereof and simultaneously expands the plastic pipe 2. The expansion mandrel 4 is used to expand that part of the plastic pipe 2 from which a socket 2*e* forms. The expansion mandrel 4 is used to expand the plastic pipe 2 so that it is compressed against the socket support 1*a* of the mould 1 in the manner shown in FIG. 1*b*.

Layers 2*a* to 2*c* in the plastic pipe 2 are of different materials to cause orientation therein at different temperatures. The inner layer 2*a* and the outer layer 2*c* can be of polyethene PE, for example, and the intermediate layer 2*b* of crosslinked polyethene PEX. The heating means 3 are used to heat the end of the plastic pipe 2 to a temperature above the crystallization point of polyethene PE, i.e. to 150° C., for example. In this case, during expansion, the inner layer 2*a* and the outer layer 2*c,* which are of polyethene, do not undergo orientation. However, the intermediate layer 2*b* undergoes a radial orientation, since at said temperature the crosslinked polyethene PEX undergoes orientation, since the network bonding produced by crosslinking prevents the material from relaxing.

Consequently, the plastic pipe 2 shown in FIG. 1*c* is achieved, the body portion 2*d* of which has three layers and to which a three-layered integral socket 2*e* is connected, the inner layer 2*a* and outer layer 2*c* of which are non-oriented and the intermediate layer 2*b* is oriented. The oriented intermediate layer 2*b* increases the mechanical strength of the socket 2*e* and also improves its barrier characteristics. The chemical characteristics of the inner layer 2*a* and the outer layer 2*c* are extremely good. Such layers endure for example solvent glues that are used in pipe joints without the socket 2*e* shrinking or its surface being cracked.

The inner layer 2*a* and the outer layer 2*c* can also be of modified polyvinyl chloride PVC, for example, in which case said layers are not oriented. In this case the oriented intermediate layer 2*b* may be of polyvinyl chloride PVC, for example.

When a plastic pipe is provided with a socket in the manner shown in FIGS. 1*a* to 1*c,* the characteristics of the materials in the different layers may also be substantially the same, if desired, whereby for example the outer surfaces the feedstock pipes only are heated. In this case the outer surface is heated to such a high temperature that the tension brought about by the drawing relaxes immediately with no orientation for example in the outer layer 2*c*. This being the case, the temperature in the inner layer(s) may be so low that orientation occurs therein.

FIG. 2 shows a second plastic pipe 2 according to the invention. In the embodiment of FIG. 2, the socket 2*e* is provided by a layer having a larger diameter than the body portion 2*d* of the pipe 2 and by a sleeve 5 disposed inside the socket. The socket 2*e* portion of the pipe 2 can be made larger for instance by heating the material of the pipe to a temperature at which it does not get orientated during expansion, and by expanding the pipe after heating. In this case the sleeve 5 is oriented such that its orientation differs from the orientation of the body portion 2*d* of the pipe and the orientation of the wall of the expanded portion of the pipe. In the sleeve 5, the direction of the orientation may be either radial or axial or it may be in both directions. A radial orientation increases the pressure resistance of the socket 2*e* and an axial orientation increases the tensile strength of the socket 2*e*.

Another way to make the socket 2*e* is to heat the plastic pipe to a temperature at which orientation is created in the wall of the plastic pipe during expansion and to expand the plastic pipe at said temperature. This being the case, the orientation in the wall of the plastic pipe is different in the body portion 2*d* and the socket portion 2*e.* The orientation of the sleeve 5 is selected such that it differs from the orientation of the wall of the plastic pipe which is an integral part of the body portion 2*d* of the socket 2*e.* The sleeve 5 may also be completely non-oriented and the orientation of the sleeve 5 may be the same as or different from the orientation of the body portion 2*d.*

The sleeve 5 may also be displaced outside the pipe 2. Consequently, the sleeve 5 may be a separately oriented sleeve or a conventionally injection moulded one. The sleeve 5 can be pushed inside the pipe 2 such that when being pushed inside, the sleeve 5 expands the end of the pipe 2. On the other hand, the end of the pipe 2 may already have been expanded exactly up to the outer dimensions of the sleeve 5. Furthermore, the end of the pipe 2 may be expanded so that it is larger than the sleeve 5, and the end of the pipe 2 is allowed to shrink onto the sleeve 5 either in such a way that a potential pipe orientation is at least partly relaxed or in such a way that it is not relaxed. The relaxation of the orientation can be prevented for example by keeping the end of the pipe axially drawn at the shrinking stage.

FIG. 3 shows a third plastic pipe 2 according to the invention. The outer surface of the sleeve 5 can be provided with grooves, projections, inclined surfaces or the like, which keep the sleeve 5 and the pipe 2 immobile with respect to one another. The sleeve 5 is preferably made by injection moulding, whereby the dimensions of the sleeve 5 are accurate and which also enables difficult shapes to be made. The sleeve 5 can be made from such a rigid material, for example glass-fibre reinforced plastic, that the shrinking of the pipe 2 onto the sleeve 5 does not substantially change the size and shape of the inner part of the sleeve 5. A second pipe 6 is arranged inside the sleeve 5. A wedge ring 7 can be arranged between the sleeve 5 and the second pipe 6. The wedge ring 7 comprises a wedge surface 7*a,* arranged against a wedge surface 5*a* of the sleeve 5. This way the wedge surfaces 5*a* and 7*a* prevent an axial motion between the second pipe 6 and the sleeve 5. The axial motion is prevented because the wedge surfaces 5*a* and 7*a* direct a strong radial friction force to said points, whereby the wedge ring 7 is tightly pressed against the second pipe 6.

The inside of the sleeve 5 can be provided with a sealing groove 5*b* into which a sealing ring 8 can be placed to ensure the tightness of the joint between the sleeve 5 and the second pipe 6.

The sleeve 5 comprises a bevelled end 9 that facilitates pushing the sleeve 5 inside the pipe 2. The orientation degrees and/or orientation directions of the materials of the pipe 2 and the sleeve 5 do not have to be the same and they can be modified so as to be suitable for each particular application. The orientation can be polymer molecule orientation and also orientation of potential fibre reinforcement. If the sleeve 5 is mainly subjected to radial stresses and forces, the orientation is directed particularly in the peripheral direction. If again the sleeve 5 is mainly subjected to axial forces, the main orientation of the sleeve 5 is axial. For example, if axial tensile stress is caused in the sleeve 5 when the wedge ring 7 rests against the wedge surface 5*a* of the sleeve 5, then the sleeve 5 is preferably oriented or fibre reinforced in the axial direction. The pipe 2 and the sleeve 5 can be made from the same polymer, but their filling agents and/or reinforcement agents and their contents may be different. The end of the pipe 2 is provided at the orifice of the pipe 2 with a flanged additional reinforcement 10 that increases the peripheral strength of the orifice in particular.

The drawings and the related description are only intended to illustrate the inventive idea. The details of the invention may vary within the scope of the claims. Accordingly, the orientation of the different layers of the socket 2*e* may be different in such a way that the different layers have different orientation degrees and/or orientation directions. Furthermore, the socket 2*e* may comprise more than two or three layers. The sleeve 5 can also be disposed inside the socket 2*e* which comprises at least two layers and forms an integral part of the body portion 2*d,* that is, the sleeve 5 could be disposed inside the socket 2*e* of FIG. 1*c,* for example.

What is claimed is:

1. A plastic pipe having a socket, the pipe comprising a body portion and at least at one of its ends the socket which has at least two layers, wherein the orientation of the material of at least one layer of the socket differs from the orientation of the material of another layer, and the orientation of the material of at least one layer differs from the orientation of the material of the body portion.

2. A plastic pipe as claimed in claim 1, wherein at least one layer of the socket is composed of a sleeve.

3. A plastic pipe as claimed in claim 2, wherein the sleeve is provided with orientation.

4. A plastic pipe as claimed in claim 2, wherein the sleeve is disposed inside the plastic pipe.

5. A plastic pipe as claimed in claim 1, wherein at least two layers of the socket are composed of a layer that is an integral part of the body portion, the orientation of at least one of the layers being different from the orientation of another layer.

6. A plastic pipe as claimed in claim 5, wherein the socket comprises at least three layers that are an integral part of the body portion.

7. A plastic pipe as claimed in claim 6, wherein the inner layer and the outer layer are of substantially non-oriented polyethene and at least one intermediate layer is of oriented crosslinked polyethene.

* * * * *